United States Patent [19]

Talmadge

[11] 4,121,145
[45] Oct. 17, 1978

[54] HIGH RESOLUTION STEPPING MOTOR DRIVE

[75] Inventor: Paul Conway Talmadge, Ansonia, Conn.

[73] Assignee: The Perkin-Elmer Corporation, Norwalk, Conn.

[21] Appl. No.: 772,178

[22] Filed: Feb. 25, 1977

[51] Int. Cl.$^2$ ............................................. H02K 37/00
[52] U.S. Cl. ................................................... 318/696
[58] Field of Search ........................ 318/138, 685, 696

[56] References Cited

U.S. PATENT DOCUMENTS

3,909,693  9/1975  Yoshitake et al. .................... 318/696

Primary Examiner—Gene Z. Rubison
Attorney, Agent, or Firm—Salvatore A. Giarratana; Francis L. Masselle; John D. Crane

[57] ABSTRACT

A stepping motor control circuit for precisely controlling the motion thereof. The control circuit energizes the motor windings according to the design sequence for rotation in a given direction. Each winding is energized by a signal having an ascending staircase for its leading edge, a descending staircase for its trailing edge and a steady state level between the leading and trailing edges. The ascending staircase and the descending staircase each comprise one quarter of the terms for each winding energizing signal. The steady state level occurs for one half the time of each energizing signal. The total number of steps in all ascending and decending staircases is controlled and selects the total rotation of the motor. When the motor reaches the desired position whether in the middle of a staircase or not, the signals coupled to the stepping motor windings are frozen at the level when the total step count is reached.

18 Claims, 5 Drawing Figures

HIGH RESOLUTION STEPPING MOTOR DRIVE

BACKGROUND OF THE INVENTION

This invention relates to the field of stepping motors and particularly to stepping motor drive circuits for achieving high resolution.

Development is stepping motors over the years has made them attractive to design engineers when slow or intermittent rotational motion is required. In conventional stepping motor applications, speed and direction of rotation is determined by the phase and frequency of power pulses applied to its stator windings with the angular rotation being directly proportional to the number of switching pulses applied thereto. Consequently, stepping motors are easily controlled by digital logic systems using standard integrated circuit logic and augmented by power amplifier circuits. Some commercially available stepping motors can be incremented in steps of 0.72° which corresponds to 500 switching pulses being applied to the stator windings for each revolution of its rotor. Stepping motors having a 1.8° step angle per pulse, however, are more readily available and are made in a wider range of sizes. Accordingly, stepping motors which provide 1 full revolution of the rotor for every 200 switching pulses are more commonly encountered in stepping motor applications.

For stepping motors of the type having 1.8° rotation for each stepping pulse, the degree of positional precision is limited by the number of pulses which must be applied to the stator windings in order to complete one revolution of the rotor. As such, these motors by themselves are capable of coming to rest at only one of 200 unique positions. While this number of unique positions may be more than adequate for many applications of stepping motors, they are not well suited for positioning of diffraction gratings or the like in optical instruments because the incremental steps are larger than is desirable for such applications.

In overcoming the resolution limitations of stepping motors of the type described above, engineers have resorted to gearing systems or combinations of two or more stepping motors to provide greater positional resolution. These approaches frequently add considerably to instrumentation cost as well as mechanical complexity which, to a large measure, negates the value of using a stepping motor in the first place. Addtionally, where gearing systems are employed, the overall response time is significantly reduces as the resolution is increased and expensive antibacklash techniques must be employed.

A further problem with utilizing stepping motors of the type described above with conventional pulse controls arises from the fact that each time the motor is stepped, there is an accompanying tendancy to generate vibrations in the driven elements as well as in the support for the stepping motor. In some cases, this vibration is so severe as to limit the utility of the motor for a particular application. Some approaches have been developed to mitigate these vibrations which include gearing, as described above, or viscous damping. These approaches, however, are effective in reducing vibrations at the expense of decreased slew rate and increased stepping response time. A further approach for overcoming the vibration problem is to drive a stepping motor smoothly, without steps, by an electronic oscillator or a mechanical sine-cosine generator. System versitility, however, is lost because, in the first place, analogue sinusoidal oscillators have a finite minimum frequency, and in the second place, exclusively electronic control is precluded.

In view of the foregoing and other difficulties experienced in using stepping motors, it is an important objective of the present invention to provide a stepping motor control circuit capable of achieving higher resolution than has heretofore been achieved.

It is a further objective of the invention to provide a stepping motor control circuit which, while achieving high resolution, does not degrade the response time.

It it yet a further objective of the invention to provide a stepping motor control circuit which permits the assembly to be mechanically simple in construction while achieving increased resolution.

It is yet a further objective of the invention to provide a stepping motor control circuit capable of providing increased resolution while minimizing the cost for the control circuit.

It is still another objective of the invention to provide a high resolution stepping motor control that maintains position integrity.

BRIEF DESCRIPTION OF THE INVENTION

In achieving these and other objectives, the stepping motor control according to the invention provides circuitry to energize the windings of a stepping motor according to the normal sequence established for the particular stepping motor controlled thereby. Each time a winding is energized, however, the leading and trailing edges of an energizing current pulse are made into a staircase rather than single steps. In addition, when one winding is being turned on by an ascending staircase signal, an adjacent winding is maintained at a plateau i.e., the current is at a steady non-zero selectable value. Once the ascending staircase signal arrives at the same plateau current, the signal applied to the adjacent winding becomes a descending staircase until it reaches zero. Then the opposite adjacent winding to said one winding is energized by an ascending staircase signal which stops ascending when the signal reaches the plateau value.

Each step of each staircase corresponds to an incremental step in the overall positioning of the stepping motor. The total number of steps, both ascending and descending are operative to control the extent to which the stepping motor turns from its reference or "home" position. The sequence in which windings are energized is operative to control the direction of rotation.

BRIEF DESCRIPTION OF THE DRAWINGS

The foregoing and other objects, advantages, and features of the invention are described hereinafter in greater detail in connection with the drawings herein.

DETAILED DESCRIPTION

Figure 1:
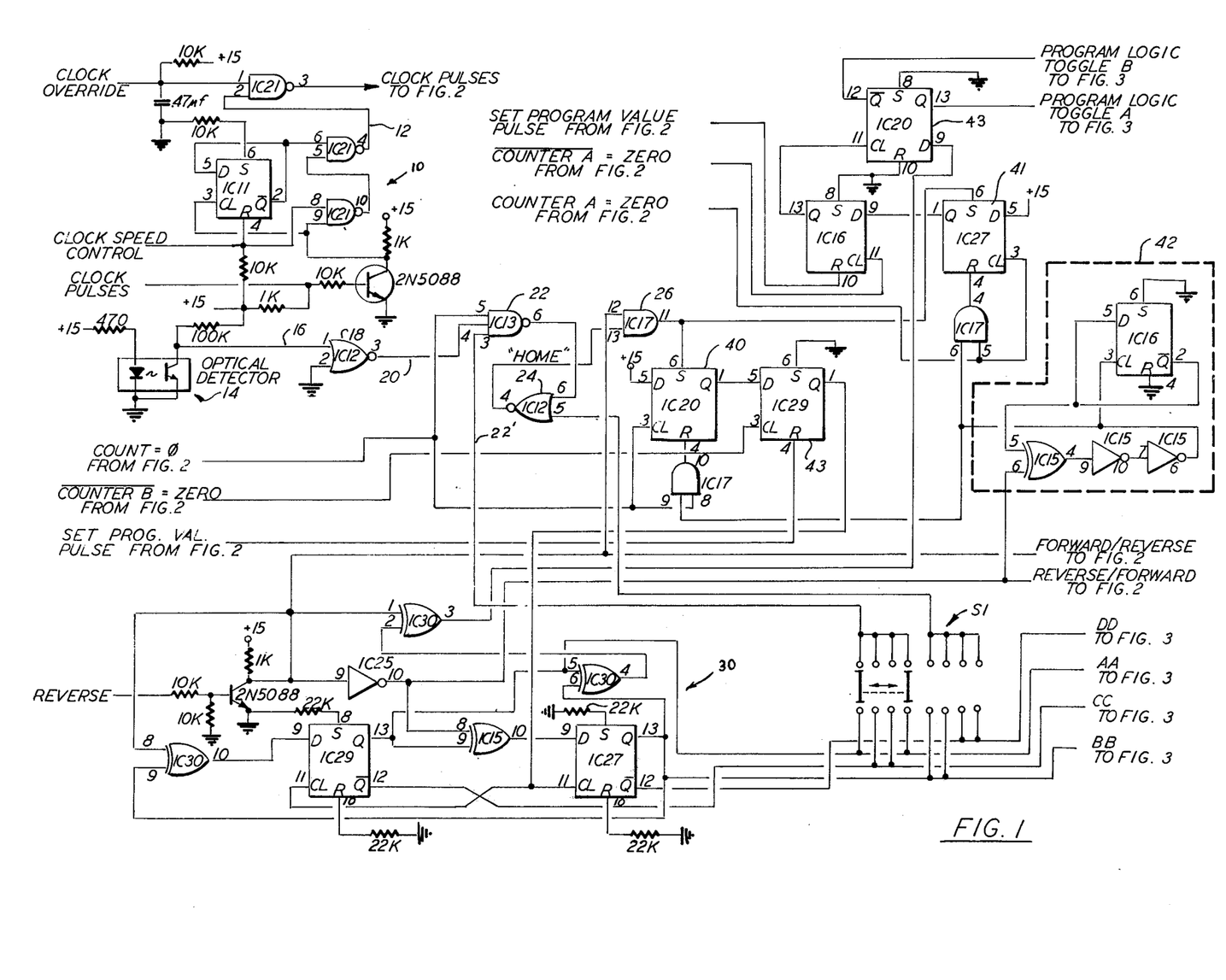
FIGS. 1-3 are a detailed circuit diagram showing the preferred embodiment of the present invention.

Referring first to FIG. 1, the circuitry according to the present invention has several input which come from outside the system from switches, pulse generators or the like. The Clock Override input in FIG. 1, for example, may be generated by an external switch or electronic logic to provide either a floating input level or a ground level signal. In most instances, the Clock Override input is at a floating level which prevents overriding the clock pulses which enter the system on the Clock Pulses input line. If the Clock Override input line is at ground level produced, for example, by closing a switch connection to ground, the circuitry of FIG. 1 is operative to prevent clock pulses from appearing on the clock Pulses output line which connects to circuitry in FIG. 2.

As indicated above, clock pulses are applied to circuitry of FIG. 1 via the Clock Pulses input line. These pulses nominally occur at a 2KHz frequency and comprise a string of square wave pulses, X in number, where X corresponds to the number of incremental steps that the stepping motor controlled by the circuitry according to the invention is desired to be rotated.

Figure 4:
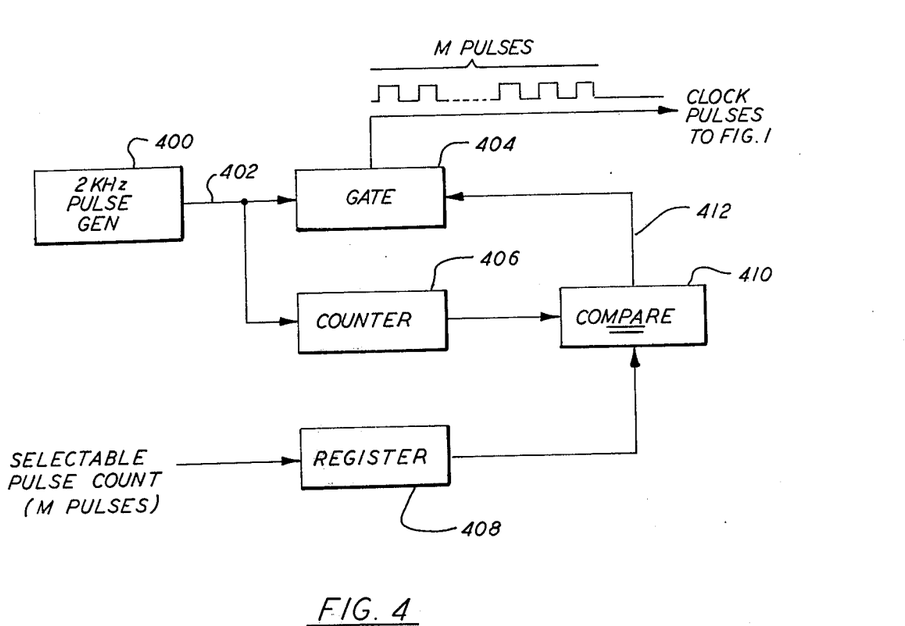
FIG. 4 is a schematic diagram for a clock pulse generating circuit used in connection with the circuitry in FIGS. 1-3.

The clock pulses can be generated by any suitable source. One such source is shown in FIG. 4 which includes a 2KHz pulse generator 400 which produces a square wave output at 402 which is coupled to a gate 404 and a counter 406. The gate 404 normally passes the pulses from the generator 400 to the Clock Pulses line which couples to the circuitry in FIG. 1. The counter 406 counts the clock pulses from the generator 400. A register 408 is set prior to starting the pulse count by the counter 406 with a number corresponding to the number of pulses X desired to be coupled to the circuitry of FIG. 1. When the pulse count in the counter 406 equals the number X in register 408, the compare equal circuit 410 detects this condition and places a signal on line 412 to close the gate 404 so that further pulses produced by the generator 400 are not passed to the Clock Pulses line to FIG. 1.

While the above described clock pulse generator circuit will produce X clock pulses in a pulse train, alternative circuits may be used for the same purpose. In addition, the generator shown or alternative circuits may operate at higher or lower frequencies.

The Clock Speed Control input line is either at ground or floating and is operative to control the operation of a pulse frequency divider network indicated generally at 10. Whenever the Clock Speed Control input line is at ground, the pulse divider network 10 operates as a flip-flop so as to divide the frequency of pulses appearing on the Clock Pulses input line in half and present the lower frequency pulse train on the output wire 12 from the pulse divider network 10.

Figure 2:
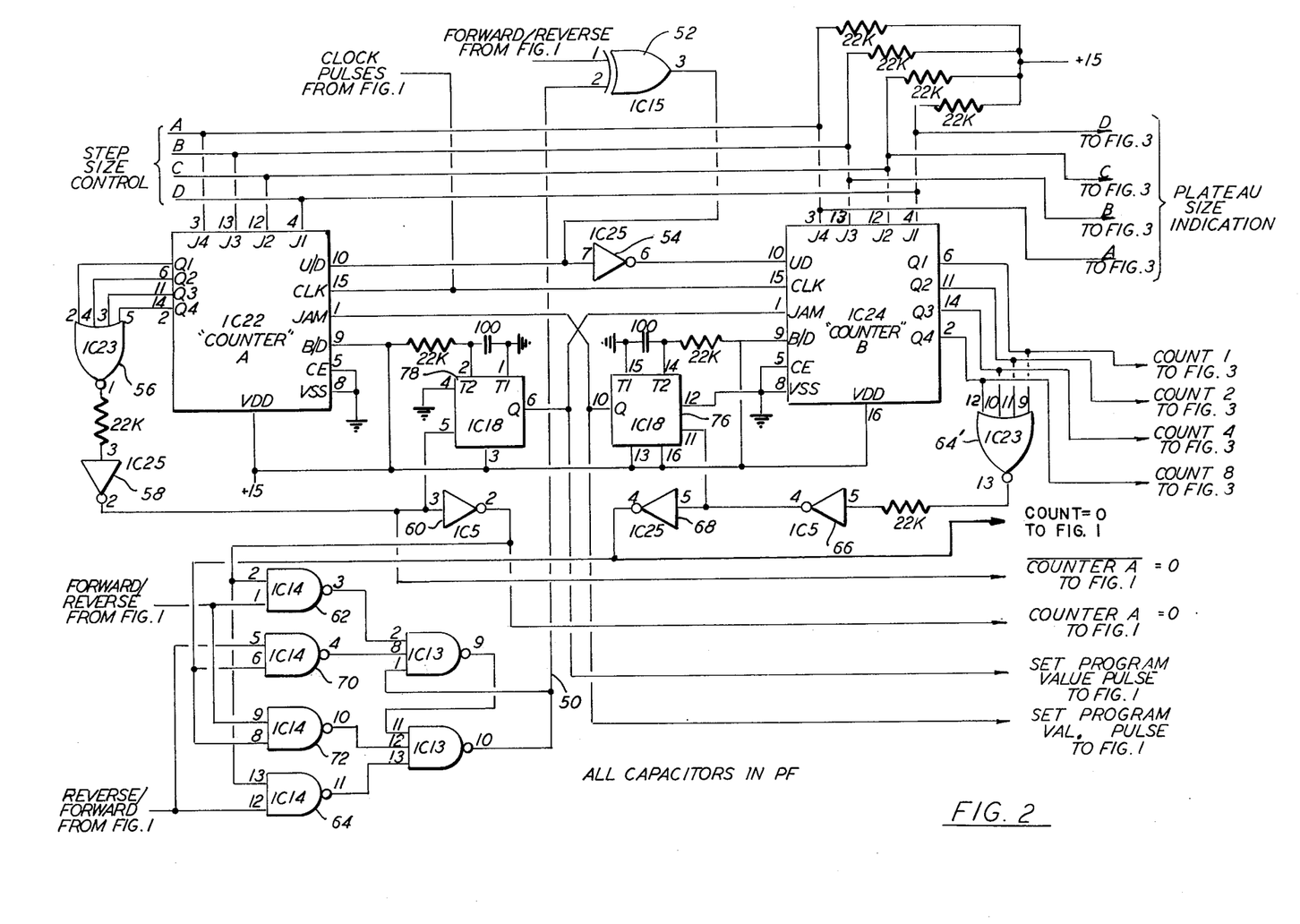

Accordingly, the circuitry described above in FIG. 1 is operative to produce on the Clock Pulses output line connecting to circuitry on FIG. 2 a pulse train having a frequency of either 1 or 2KHz if the frequency of pulses applied to the Clock Pulses input line is at 2KHz and the Clock Override input is floating.

The circuitry of FIG. 1 also includes an Optical Detector indicated generally at 14 which is used in connection with the stepping motor to determine when the rotor is at its "home" position. A disk of optically opaque material is attached to the rotor and a slot is made through the disk having an effective width of approximately 5 degrees of rotor rotation. The optical detector 14 comprises a light emitting diode or the like disposed on one side of the disk and a photosensor disposed on the other side of the disk. When the slot is positioned between the light emitting diode and the photosensor, the photosensor senses the light from the source and places a low voltage on the wire 16 to indicate that the stepping motor rotor is within 5° of its "home" position. When the stepping motor is away from the home position, however, the voltage on the wire 16 is high. This signal on line 16 is inverted by logic gate 18 and provides a high level on the wire 20 when the rotor is within 5° of the "home" position and a low level when the rotor is away from "home".

The circuit of FIG. 1 also has a Count = $\phi$ input line which comes from the circuitry of FIG. 2. This line couples to NAND gate 22 and has a high level applied thereto whenever Counter B, described later in greater detail in connection with FIG. 2 is zero. Otherwise, the Counter = $\phi$ input line is at a low level.

The input 22' to logic gate 22 from switch S1 is high whenever the rotor of the stepping motor is positioned within two steps of the selectable "home" position which comprises one of four adjacent step positions for the stepping motor.

When the voltage on wire 20, the Counter = $\phi$ input line and the input wire 22' is high, the rotor of the stepping motor is within two steps of "home" position. This produces a low level signal at its output pin 6 of NAND gate 22 which couples to input pin 6 of a NOR gate 24. The signal on the other input (pin 5) of NOR gate 24 comes from switch S1 and is low when the rotor is at one of two particular steps. However, as will become evident later, the coincidence of the desired signal from S1 at the input pin 3 of NAND gate 22 and the input at pin 5 of NOR gate 24 occurs only for one particular step. At that particular step, the output at pin 4 of the NOR gate 24 goes high indicating the rotor is at "home" position.

When the rotor is at "home" position and the system is in Forward mode, AND gate 26 provides a high level signal to set the coupled flip-flops 40 and 41 thereby preconditioning them so that the system will thereafter respond correctly when a command is issued to advance the rotor from the "home" position to another position.

A further external input to FIG. 1 is labled Reverse and has either a high or a ground level signal. In accordance with the conventions established in the circuitry of the drawings, a Reverse signal on the Reverse line comprises a high level signal and a forward signal comprises a ground level signal. The signal on the Reverse line is utilized by the circuitry according to the present invention to cause the rotor of the stepping motor to move in a forward or a reverse direction. The manner in which the circuitry responds to the signal on the Reverse line will be described hereinafter in greater detail.

In addition to the above described circuitry, the circuitry of FIG. 1 includes a Coarse Winding Selector circuit indicated at 30 and includes two counter circuits IC 27 and IC 29 as well as several EXCLUSIVE OR gates labeled as IC 15 and IC 30. In its broadest sense, the Coarse Winding Selection circuit 30 is operative to place either a high or a low signal level on the output lines labeled AA, BB, CC and DD which are utilized in circuitry in FIG. 3 in a manner described hereinafter in greater detail.

Figure 3:
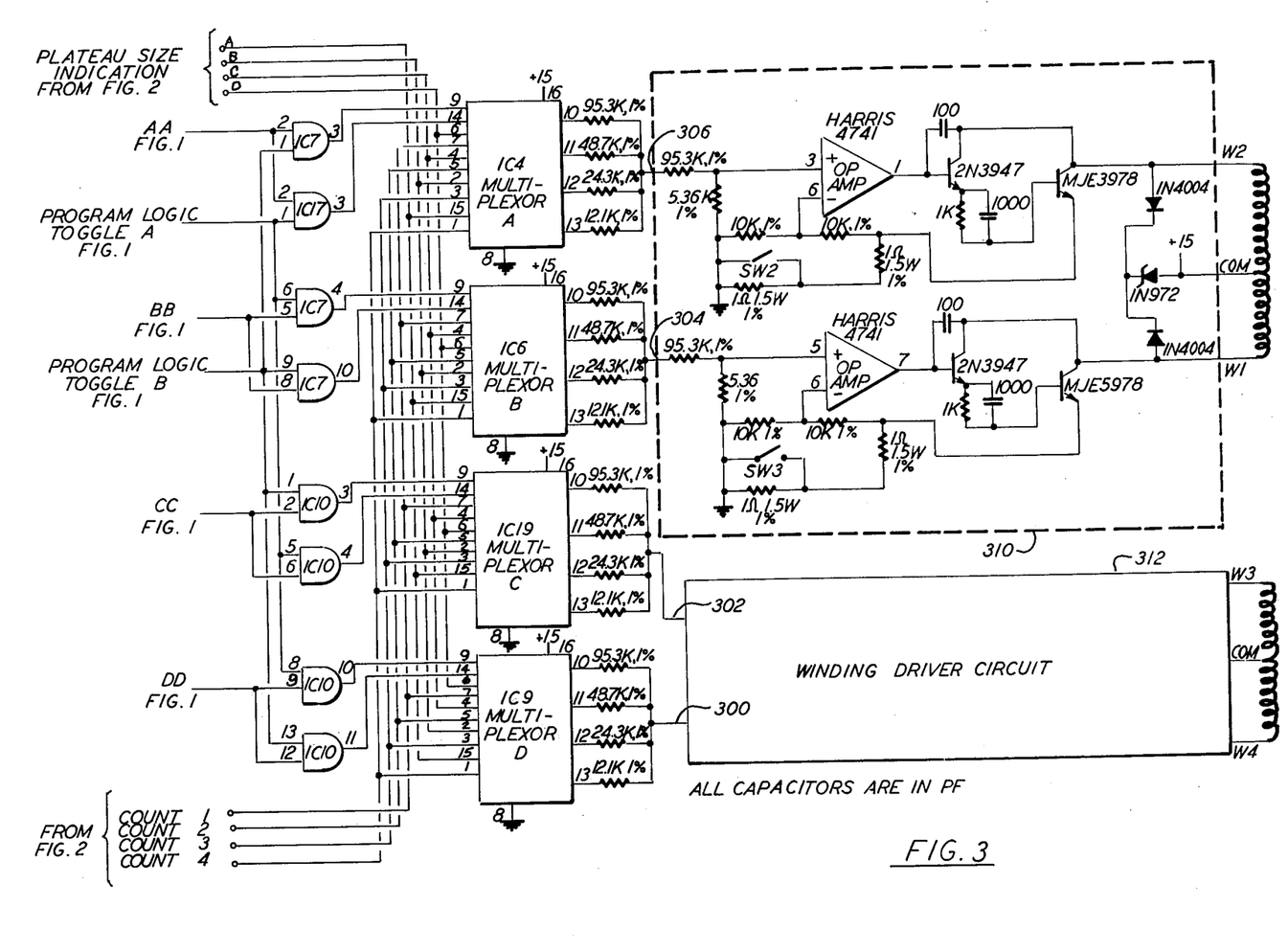

The circuitry of FIG. 1 also includes circuit means for developing two output signals: namely, Program Logic Toggle A and Program Logic Toggle B. The signal level of these output lines are opposite to each other and change whenever the count in Counter A (IC 22 in FIG. 2) changes from a count of zero to a count of one. The significance of this change of state will become more apparent later, however, its function is to condition two of the multiplexers in FIG. 3 to receive the Plateau Size Indication input and two of the multiplexers to receive the input from Counter B (IC 24 in FIG. 2). It will be recalled that the circuitry indicated generally at 30 is operative to control the coarse multiplexer selection so in combination with the Program Logic Toggle A and B signals, one multiplexer in FIG. 3 is conditioned to receive the output of Counter B (IC 24 in FIG. 2) and another multiplexer to receive the Plateau Size Indication lines A, B, C and D from FIG. 2.

The remaining circuitry of FIG. 1 handles special conditions. For example, an edge detector is shown within dotted ine 42. This edge detector produces a pulse at the output pin 6 of invertor IC 15 whenever the signal level on the Reverse input line changes. Should Counter A in FIG. 2 be zero at the same time the Reverse input changes, flip-flop 41 is reset. Should Counter B be zero i.e., the line Count = φ is high when the Reverse input changes, than flip-flop 40 is reset. Resetting flip-flop 40 under these conditions, disables the course winding selection transition of the Course Winding Selector 30 the next time Counter B (FIG. 2) counts from zero to one. Resetting flip-flop 41 under the above stated conditions causes the Program Logic Toggle 43 to remain at the proper state when a reverse direction command is given the system by changing the level of its Reverse input line to FIG. 1.

Referring now to FIG. 2, it is initially assumed that the Forward/Reverse line from FIG. 1 and the Reverse/Forward line from FIG. 1 are at a fixed and opposite logic state. When this occurs, and either Counter A or Counter B is counting down and eventually goes to zero causing the RS flip-flop comprising circuit module IC 13 to change state. This changed state is transmitted over a wire 50 to a programable inverter 52 which either inverts or passes the signal on line 50 depending the state of the Forward/Reverse signal from FIG. 1 which is connected to input pin 1 of the programable inverter 52. The output of the programable inverter 52 couples to the up/down input of Counter A (IC 22) and via an inverter 54 to the up/down input of Counter B (IC 24). Accordingly, one of the counters, either Counter A or Counter B, is conditioned to count in one direction and the other counter is always conditioned to count in the opposite direction.

Counter A has a NOR gate 56 coupled to its counter output pins 6, 11, 14 and 2. Whenever all of the inputs to the NOR gate 56 are low indicating that counter A is at zero, the output of NOR gate 56 goes positive. This signal is transmitted through the inverter 58 and the inverter 60 to NAND gate 62 and 64. When this occurs, the state of the RS flip-flop comprising IC 13 changes state thereafter causing Counter A to count up and Counter B to count down.

The Counter B (IC 24) also has a NOR gate 64' coupled to its output pins 6, 11, 14 and 2 so that whenever the counter is at zero, a positive signal appears at the output of NOR gate 64. This zero indication is transmitted via an inverter 66 and inverter 68 to the NAND gates 70 and 72 which, causes the RS flip-flop comprising IC 13 to change state thereafter causing Counter B to count up and Counter A to count down.

The circuitry of FIG. 2 also includes circuit means so that when one counter, either A or B, goes to zero, the other counter, either B or A, is set to a programable maximum value. This is accomplished in the following manner. Assume that Counter B is counting down and goes to zero. When this occurs, the output of the EXCLUSIVE OR gate 64' goes positive and this signal is inverted by the inverter 66 to apply a low signal to the input pin 11 of a monostable circuit 76 of short duration. When the signal at input pin 11 of circuit 76 goes low, the output at pin 10 thereof pulses high and this pulse is coupled to pin 1 of Counter A causing it to be set to a value corresponding to the binary input at pin 3, 13, 12 and 4. The signals appearing at these pins are controlled by an external step size control coupled thereto respectively over lines labeled A, B, C and D which may comprise, for example, a switch which is either open or short circuited. When a switch is open circuited, the voltage on the line connected thereto is high and when the switch is closed, the voltage on the line connected thereto is low. In accordance with the conventions established for the circuitry shown in FIG. 2, a high level signal on any one line corresponds to a binary one and a low signal corresponds to a binary zero. Accordingly, if the Counter A is to be set to a maximum binary value of 8, the switch coupled to line A is open circuited and those coupled to lines B, C and D are closed circuited.

In a similar manner, Counter B is set to a maximum programable value as defined by the selectable value for the Step Size Control whenever Counter A goes to zero. This is accomplished when the NOR gate 56 detects a zero at the output of Counter A, the high signal appears at its output which is converted by the inverter 58 to a low at the pin 5 input to integrated circuit 78 which is also a monostable circuit of short duration. When the voltage at input pin 5 of circuit 78 goes low, the output at pin 6 pulses high and this pulse is coupled at pin 1 of Counter B. This causes Counter B to be set to a value corresponding to the signals applied at its input pins 3, 13, 12 and 4 in the manner as described earlier in connection with setting Counter A. Accordingly, whenever one counter goes to zero, the other counter is set to a programable maximum established by the Step Size Control. Thereafter, the circuitry of FIG. 2 and FIG. 1 is operative to cause the Counters A and B to respond to clock pulses supplied at input pin 15 thereof so that the counter which just reached zero begins counting up each time a clock pulse is applied thereto and the other counter which was just set to its programable maximum, counts down for each clock pulse received.

Referring now to FIG. 3, the circuitry therein includes four multiplexer circuits labeled Multiplexer A, B, C and D. Each multiplexer circuit has an AND gate coupled to input pin 9 and another AND gate coupled to pin 14. When a high level signal is applied to pin 9, the coupled multiplexer circuit responds to the count output from Counter B which couples to pins 7, 5, 3 and 1 via the input lines labeled Count 1, Count 2, Count 3 and Count 4. On the other hand, when a high level signal is coupled to pin 14 of a multiplexer circuit, the multiplexer responds to the plateau size indication which couples to pins 15, 2, 4 and 6 via the input lines from FIG. 2 labeled A, B, C and D. In either case, each multiplexer circuit responds to the signals input thereto to produce a signal at its output pins 10, 11, 12 and 13 each of which is coupled via a resistor to an output point such as those labeled 300, 302, 304 or 306. The signal appearing at an output point is related to the binary value for the number on the active input line to the multiplexer coupled thereto. Accordingly, since four input lines can be activated at any one time each to one of two binary values, each multiplexer circuit with the resistor network coupled to its output pins 10, 11, 12 and 13 is operative to produce one of 16 different output voltages where the particular output voltage at a given moment in time corresponds to the binary value at the input. For the circuitry shown in FIG. 3, the output voltage at any of the output points 300, 302, 304 or 306 corresponds to 0.939 volts multiplied by the binary number appearing at its input.

In accordance with the operation of the invention, the AND gates coupled to the input terminals 9 and 14 of multiplexers A, B, C and D, are operative in the following manner. The input line AA comes from the Coarse Winding Selector circuit 30 in FIG. 1 and, whenever it is at a high logic level, multiplexer A is conditioned to respond either to the Plateau Size Indication or the count in Counter B of FIG. 2, depending on whether the signal from the Program Logic Toggle A or Program Logic Toggle B is positive. If Program Logic Toggle A is positive, a positive signal is coupled to pin 14 so that multiplexer A responds to the plateau size indication received via input lines A, B, C and D. On the other hand, if Program Logic Toggle B is positive, multiplexer A is conditioned to respond to the count of Counter B.

In a similar manner, the input line BB from the Coarse Winding Selector 30 of FIG. 1, is operative to condition multiplexer B to respond to either the plateau size indication or the count in Counter B, depending on the status of the Program Logic Toggle A or B input. When the Program Logic Toggle A input is positive, multiplexer B is conditioned to respond to the count in Counter B. On the other hand, when the Program Logic Toggle B input is positive, multiplexer B responds to the plateau size indication.

In a similar manner, the input lines CC and DD respectively condition multiplexer C and multiplexer D. When multiplexer C is conditioned by a positive level on input line CC, muliplexer C responds to the count in Counter B when the Program Logic Toggle B is positive and responds to the Plateau Size Indication when Program Logic Toggle A is positive. Multiplexer D, on the other hand, is actuated when the signal DD is positive and responds to the count in Counter B whenever Program Logic Toggle A is positive and responds to the Plateau Size Indication whenever Program Logic Toggle B is positive.

Figure 5:
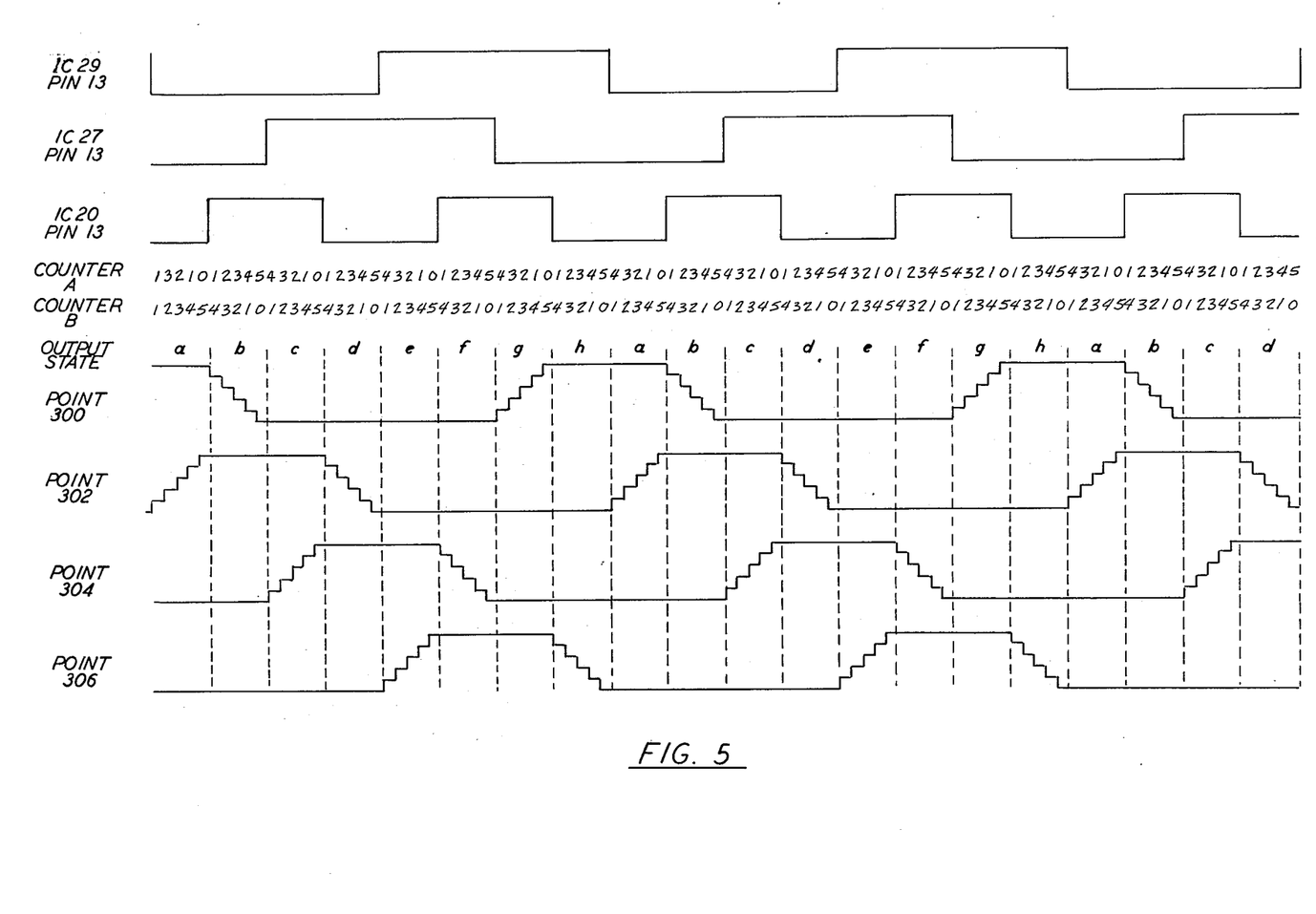
FIG. 5 is a timing pulse diagram for various signals in the circuitry FIGS. 1-3.

Referring briefly to FIG. 5, the voltage appearing at various circuit points in the circuits of FIGS. 1–3 is shown. In accordance with the operation of the invention, therefore, eight output states can be defined for the signals which appear at the output points 300, 302, 304 and 306. These output states are control led by the Program Logic Toggle 43 and the Coarse Winding Selector 30. For example, during a period of time defined as output state a, the voltage at point 300 is at a plateau and has a magnitude corresponding to the number applied via the Plateau Size Indication input lines to FIG. 3. For the circuitry according to FIGS. 1–3 where the plateau size indication is arbitrarily selected to be a binary 5, the voltage at output point 300 is 4.695 volts (0.939x5) during output state a. Also during output state a, the voltage at point 302 comprises an ascending staircase signal where the voltage is zero just prior to the beginning of output state a and rises upwardly in five equal steps of 0.939 volts each to 4.695 volts. The output voltage at points 304 and 306 is zero during output state a.

During output state b, the voltage at point 300 comprises a descending staircase signal descending from 4.695 volts in five steps of 0.939 volts each to zero volts. Points 304 and 306 during output state b remain at zero volts. The voltage at point 302 is at a plateau defined by the plateau size indication input lines which, for the illustrated circuit when the plateau size is 5, is 4.695 volts.

During output state c, the voltage at point 302 remains at the plateau voltage of 4.695 volts while the voltage at point 304 comprises an ascending staircase signal beginning at zero and rising in equal steps of 0.939 volts to 4.695 volts. The voltage at points 300 and 306 remains zero during output state c.

During output state d, the voltage at point 302 comprises a descending staircase signal beginning at 4.695 volts and falling in equal steps of 0.939 volts to zero volts while the voltage at point 304 remains constant at 3.695 volts. The voltage at points 300 and 306 remains zero during output state d.

During output state e, a zero volt signal appears at output points 300 and 302. The voltage at point 304, however, is at a plateau level and is equal to 4.695 volts. The voltage at point 306 comprises an ascending staircase beginning at zero volts and rising in equal steps of 0.939 volts to 4.695 volts.

During output state f, the voltage at output point 300 and 302 remains at zero volts. The voltage at point 302, however, comprises a descending staircase beginning at 4.695 volts and falling to zero volts in 0.939 volt steps. The voltage at point 306 during output state f, however, remains constant at the plateau value of 4.695 volts.

During output state g, however, the voltage of pounts 302 and 304 remains zero while the voltage at point 300 comprises an ascending staircase beginning at zero volts and rising in equal steps of 0.939 volts to 4.695 volts. The voltage at point 306 remains constant at the plateau value of 4.695 volts.

During output state h, the voltage of points 302 and 304 is again zero volts while the voltage at point 300 is at the plateau value equal to 4.695 volts. The voltage at point 306, however, comprises a descending staircase beginning at 4.695 volts and falling in equal steps of 0.939 volts to zero volts.

The foregoing analysis in connection with FIG. 5 assumes that a long string of input pulses appears at the Clock Pulses input to FIg. 1 and that the Plateau Size Indication is set to a 5. The analysis also assumes that the Reverse input to FIG. 1 remains constant. It should be recognized that output voltage during each step in either an ascending or a descending staircase signal which is developed at an output point occurs for a period of time corresponding to a single pulse appearing at the Pulses Input line to FIG. 1. In the event that the string of pulses appearing thereat ends which indicates that the stepping motor controlled by the circuitry of FIGS. 1–3 has reached its desired position, the voltage appearing at each of the output points 300, 302, 304 and 306 remains thereafter constant and corresponds exactly to the voltage appearing there during the last clock pulse input to FIG. 1. Accordingly, a maximum of two adjacent output points 300, 302, 304 or 306 can be energized when the stepping motor has reached its desired position. It also should be noted that one output point 300, 302, 304 or 306 is always at a plateau magnitude.

Each of the motor windings W1, W2, W3 and W4 is coupled to a given multiplexer in FIG. 3 and is powered by a winding driver circuit disposed between the output point 300, 302, 304 and 306 and the windings W1, W2, W3 and W4. The driver circuitry for windings W1 and W2 is quite conventional and is shown within the dotted line 310. The circuitry within dotted line 310 is duplicated within the box labeled winding driver circuit 312 which is operative to power windings W3 and W4 in response to the voltage appearing at points 300 and 302. The circuit within dotted line 310 responds to the voltage at points 304 and 306 to respectively drive windings W1 and W2.

By way of example, the circuitry coupled to winding W2 is described briefly. The voltage appearing at point 306 couples via an operational amplifier to a driver transistor type 2N3947 which drives a power transistor type MJE5978. The magnitude of the current flowing through the winding W2 is controlled primarily by the voltage appearing at input point 306 and is directly proportional thereto. For the specific circuit shown in FIG. 3, the maximum driving current through a typical stepping motor winding W2 is in the order of 2 amps when the switch SW2 is closed. When the switch SW2 is open, however, the maximum driving current through the winding W2 is approximately one amp. Accordingly, switch SW2 is operative to select the maximum current for the coupled winding and the voltage at the input point 306 is operative to control the exact current. The circuitry within dotted line 310 need not be further described as it performs in a conventional manner as a stepping motor winding driver circuit. The only special note need be made in connection with the zener diode 1N972 and the didoe 1N4004 connected in series across the output winding W2. This diode and zener diode combination is operative to prevent the positive voltage across the power transistor MJE5978 from exceeding approximately 36 volts by providing a short circuit should the voltage exceed that value across the windings W2. In this manner, the power transistor is protected against voltages developed in winding W2 when the magnetic field passing therethrough is changing.

To summarize the operation of the control circuit as described above, each stepping motor winding is powered by a driver circuit that controls the current through the winding coupled thereto. The winding current is controlled by the control signals developed at points 300, 302, 304 and 306 by the control circuit. The control signals maintain a selectable magnitude current through any one motor winding (W1, for example) for a time period starting just before one adjacent winding driver circuit produces a descending staircase current (through, for example, W2) until just after the other adjacent winding driver circuit produces and ascending staircase current (through, for example W3). The control circuit produces an ascending staircase current through said one motor winding after the driver circuit for a non-adjacent winding completes a descending staircase current (through, for example, W4). The control circuit produces a descending staircase current through said one winding after the other adjacent winding driver circuit has completed its ascending staircase current and is at said selectable magnitude current.

As indicated above, in connection with FIG. 5, the foregoing description assumes that the Reverse input to FIG. 1 is at a selected level. If that signal is reversed, however, the output state appearing at the respective output points 300, 302, 304 and 306 change in a manner so that the stepping motor coupled to the winding driver circuits of FIG. 3 will turn in the opposite direction. In accomplishing this objective, however, the output states defined with respect to the voltages at points 300, 302, 304 and 306 changes to that described below.

When operating in the reverse mode, output state $a'$ has a plateau voltage at output point 300 and an ascending staircase voltage at output point 306 while the voltage at point 302 and 304 is zero. During output state $b'$, the voltage at output point 300 comprises a descending staircase and the voltage output point 306 is steady at the plateau voltage level. The voltage at point 302 and 304 remains zero. During output state $c'$, the voltage at output point 304 comprises an ascending staircase and the voltage is output point 306 remains at the plateau value. The voltage at point 300 and 302 remains zero. During output state $d'$, the voltage at point 304 is a plateau voltage and that at point 306 comprises a descending staircase. The voltage at point 302 and 300 remains zero. During output state $e'$, the voltage at point 302 is an ascending staircase, the voltage at point 304 is a plateau voltage and the voltage at point 300 and 306 is zero. During output state $f'$, the voltage at point 304 is a descending staircase, the voltage at point 302 is a plateau voltage and the voltage at point 300 and 306 is zero. During output state $g'$, the voltage at point 300 is an ascending staircase, the voltage at point 302 is a plateau voltage and the voltage at point 304 and 306 is zero. During output state $h'$, the voltage at point 300 is a plateau voltage, the voltage at point 302 is a descending staircase and the voltage at point 304 and 306 is zero. The sequence of state $a'$ through state $h'$ continues until clock pulses are terminated at the Clock Pulses input to FIG. 1. Since the sequence in which the output points are energized is the reverse of that in FIG. 5, the coupled stepping motor is driven in the opposite direction from that described earlier when the voltage on the Reverse input line to FIG. 1 is at the level originally assumed therefor.

With respect to the circuitry of FIGS. 1–5, it should additionally be noted that the plateau value can be changed by either changing the driver circuit switches, such as SW2, or by changing the Plateau Size Indication. When the former approach is used, the level of the plateau and the magnitude of each step is changed. When the latter approach is used, the resulting change in the output signal at the points 300, 302, 304 and 306 is to either increase or decrease the number of steps in each ascending and each descending staircase. In fact, the number of steps in each ascending and each descending staircase is identical to the number which is selected for the Plateau Size Indication input to FIG. 3. In like manner, the Plateau Size Indication also corresponds to the maximum value to which counters A and B are set in the manner indicated earlier. Accordingly, the output voltage at point 300, 302, 304 and 306 will vary between zero volts and N × 0.939 volts where N corresponds to the number to which the Plateau Size Indication is set.

Another circuit operating characteristic is that the number N, which corresponds to the Plateau Size Indication also is related to the number of pulses needed to be applied to the Pulses Input to FIG. 1 to produce a given rotation of the stepping motor coupled to the winding driver circuits of FIG. 3. It can be shown for conventional stepping motors which are operative to produce a 1.8° rotation for each step, 2N pulses are produced by the control circuit of the invention to produce 1.8° of rotation in the stepping motor coupled to the circuits of FIG. 3. Accordingly, if N is set to the number 9, 18 pulses are required to be input to the circuitry of FIG. 1 to produce a 1.8° rotation in the coupled stepping motor and each pulse input to the circuitry of FIG. 1 is operative to step the rotor of the stepping motor by 0.1°. On the other hand, if the number N is set to 3, 6 pulses must be input into the circuitry of FIG. 1 to move the rotor by 1.8°. Therefore, each pulse input to FIG. 1 is operative to step the stepping motor by 0.3°.

In summary, the circuits of FIGS. 1-3 are operative to control a stepping motor such as a Computer Devices, part No. 23 D-6102C or a Superior Electric, part No. M061-FD02E. Such motors are operative in 1.8° rotation steps i.e., there are 200 steps per revolution. When coupled to the circuitry of the invention, the maximum current through any motor winding is maintained below the saturation level so each step in driving current can be responded to by the motor. Moreover, each "current pulse" applied to any winding comprises three components: an ascending staircase for its leading edge, a plateau and a descending staircase for its trailing edge. Each ascending and descending staircase has N steps where N is the Plateau Size Indication selected by the operator. The plateau has a duration which lasts the same period of time for an ascending staircase at one adjacent winding and a descending staircase at the other adjacent winding. In other words, a plateau lasts the amount of time required for 2N steps.

Experiments have shown that the system according to the invention as shown in FIGS. 1-3 causes the stepping motor mentioned above to turn 1.8° for every 2N steps (2N pulses input to the system) and that each pulse causes the rotor to turn 1.8°/2N. Accordingly, positional resolution is increased by increasing the number of steps in each staircase signal. The system also allows the operator to know the rotor position simply by counting input pulses in one direction when in forward mode and counting in the opposite direction when in reverse mode. The resulting pulse count M specifies that the rotor position is 1.8M/2N° from "home" position.

The above relationships can be maintained provided the stepping motor is not overloaded causing the rotor to "slip" relative to the position it should be at. As a rule of thumb, the motor load should be in the order of ½ the available power although a greater load can be applied. By maintaining the lower load, reliability is increased.

Another feature of the invention is that the steps in the staircase signals need not be equal in magnitude. The magnitude can be changed by changing the values for the resistors coupled to the multiplexer output pins 10, 11, 12 and 13 in FIG. 3 in accordance with manufacturers specifications.

For the preferred circuitry of FIGS. 1-3, most of the circuit elements are identified specifically thereon. The remaining circuits are identified in the following parts list.

| IC12 | RCA | CD4001 |
| --- | --- | --- |
| IC23 | RCA | CD4002 |
| IC14 | RCA | CD4011 |
| IC11, 16, 20, 27, 29 | RCA | CD4013 |
| IC13 | RCA | CD4023 |
| IC22, 24 | RCA | CD4029 |
| IC15, 30 | RCA | CD4030 |
| IC5, 25 | RCA | CD4049 |
| IC7, 10, 17 | RCA | CD4081 |
| IC21 | RCA | CD4093 |

-continued

| IC4, 6, 9, 19 | Motorola | MC14519 |
| --- | --- | --- |
| IC18, | Motorola | MC14528 |

The foregoing description of the invention has been made with particular emphasis on circuitry shown in FIGS. 1-3 which comprise the preferred embodiment of the present invention. Those of skill in the art, however, will readily recognize that the circuitry contained in these drawings may be modified in numerous ways other than those already suggested to produce a control circuit capable of performing the same function. A further evident manner in which the circuitry can be modified is to replace those circuits which provide the inputs to multiplexers A, B, C and D with a minicomputer or the like which is operative to define the voltage levels at the input to the multiplexers to produce the signals having the same duration required to duplicate the circuit operation already described.

The foregoing and other modifications may be made to the described circuitry as depicted in the drawings without departing from the spirit and scope of the invention as defined in the following claims.

What is claimed is:

1. A method for controlling the rest position of a multipole stepping motor comprising the steps of:
   applying an energizing signal to each winding such that each signal comprises a leading edge which is an ascending staircase having a selectable number of steps and a trailing edge of a descending staircase having said selectable number of steps and a plateau between the leading and trailing edge which is at a selectable magnitude;
   producing said ascending staircase in any given winding at a time preceding that when a descending staircase is produced in an adjacent winding;
   producing said descending staircase in said given winding at a time following an ascending staircase being produced in the other adjacent winding; and
   applying said energizing signals to said windings until the total number of steps in all ascending and all descending staricases equals a selectible Number N.

2. A stepping motor control circuit for stepping motors having a given number of windings for selecting the rest position of the motor comprising, in combination:
   a control circuit for generating a given number of control signals;
   a given number of driver circuits each coupled to a unique winding and responsive to the magnitude of one said control signal to drive the winding coupled thereto with a signal whose magnitude is directly related to the magnitude of the control signal;
   said control circuit including:
   means to maintain a selectable magnitude control signal to each coupled driver starting at a time just before one adjacent winding driver circuit produces a descending staircase signal with at least one step until just after the time the other adjacent winding driver circuit produces an ascending staircase signal with at least one step, said control circuit means producing an ascending staircase signal with at least one step after a non-adjacent winding driver circuit has completed a descending staircase signal with at least one step and producing a descending staircase signal with at least one step after said other adjacent winding driver circuit has completed its ascending staircase signal with at least one step, said control circuit including means to select the total number of steps in all said ascending and all said discending staircase signals.

3. The stepping motor control of claim 1 wherein said selectable magnitude is not greater than that required to make the coupled driver circuit produce saturation in the stepping motor winding coupled thereto.

4. The stepping motor control of claim 1 wherein each ascending staircase signal has N steps and each descending staircase has N steps where N is a selectable digit.

5. The stepping motor control of claim 4 wherein said steps each take the same amount of time.

6. The stepping motor control of claim 5 wherein said selectable magnitude control signal has a duration equal to that in which $2N + 1$ steps could occur.

7. The stepping motor control of claim 1 including step amplitude control means to adjust the amplitude of each step in said ascending and said descending staircase signal so that the amplitude of each step is not always equal to the amplitude of each other step.

8. The stepping motor control of claim 1 wherein the amplitude of each step is equal to the amplitude of each other step in said ascending and said descending staircase signal.

9. The stepping motor control of claim 1 wherein said control means maintains said control signals after the last step of said selectable number of steps at the same magnitude achieved thereby during said last step.

10. A control circuit for selecting the rest postion of a stepping motor comprising, in combination:
   means to produce a series of N pulses in a finite pulse string where N is a selectable number;
   first counter means responsive to said pulse producing means to repetitively count pulses in a first direction starting at zero and continuing in said first direction to a selectable value M and thereafter count in the opposite direction from M to zero;
   second counter means responsive to said pulse producing means to repetitively count said pulses in said opposite direction starting at M and continuing to zero and thereafter counting in said first direction from zero to M;
   a driver circuit means coupled to each winding in the stepping motor;
   means responsive to both said counters to cause repetitive production of an ascending staircase signal with M steps by said driver means in successively adjacent windings of the stepping motor while said first counter counts from zero to M;
   means responsive to both said counters to cause production of a descending staircase signal with M steps by the driver circuit coupled to the windings energized by the second preceding ascending staircase signal while said second counter counts from M to zero; and
   means responsive to both said counters to energize the winding coupled to a given driver circuit means at a constant level following an ascending staircase signal and preceeding a descending staircase signal coupled to said given winding.

11. The stepping motor control circuit of claim 10 wherein the magnitude of said constant level is not greater than the level at which any winding of the stepping motor becomes saturated.

12. The stepping motor control of claim 10 wherein the duration of each said step is the same for all steps.

13. The stepping motor control of claim 10 wherein the magnitude of each said step is the same for all steps.

14. The control circuit of claim 10 including step amplitude control means to selectably adjust the amplitude of each step in each said ascending and each said descending staircase signal so that each step is not always equal to the amplitude of each other step.

15. A control circuit for energizing a plurality of windings of a stepping motor comprising, in combination:
   means to produce series of N pulses in a finite pulse string where N is selectable whole number;
   first counter means responsive to said pulse producing means to repetitively count pulses in a first direction starting at zero and continuing in said first direction to a selectable value M and thereafter count in the opposite direction from M to zero;
   second counter means responsive to said pulse producing means to repetitively count said pulses in said oposite direction starting at M and counting to zero and thereafter counting in said first direction from zero to M;
   a driver circuit means coupled to each winding in th stepping motor;
   means responsive to both said counters to produce an ascending staircase signal with M steps by one said driver means at a time, each said driver means producing such ascending staircase signal while said first counter counts from zero to M and following completion of an ascending staircase signal by a given adjacent driver means;
   means responsive to said first and said second counter to produce a descending staircase signal with M steps by one said driver means at a time, each said driver means producing such descending staircase signal while said second counter counts from M to zero and following completion of a descending staircase signal by said given adjacent driver means;
   means responsive to both said counters to product a selectable level signal by each said driver circuit for the time period following an ascending staircase signal and preceding a descending staircase signal produced by the same driver circuit.

16. The stepping motor control of claim 15 wherein the number M is a selectable number of steps.

17. A method for controlling the rest position of a four pole stepping motor with four windings comprising the steps of:
   1. energizing the first winding with a constant current not greater in magnitude than a saturating current and energizing the second winding with a multi-step ascending staircase current starting at zero and ending it at a magnitude equal to said constant current during a first output state;
   2. energizing the first winding with a multi-step descending staircase current and starting at said constant current and ending at zero and energizing the second winding with said constant current during a second output state;
   3. energizing said second winding with said constant current and energizing the third winding with a multi-step ascending staricase current starting at zero and ending at said constant current during a third output state;

4. energizing the third winding with said constant current and said second winding with a multi-step descending staircase current beginning at said constant current and ending at zero during a fourth output state;
5. energizing the third winding with said constant current and said fourth winding with a multi-step ascending staircase current beginning at zero and ending at said constant current during a fifth output state;
6. energizing the fourth winding with said constant current and said third winding with a multi-step descending staircase current beginning at said constant current and ending at zero during a sixth output state;
7. energizing the fourth winding with said constant current and said first winding with a multi-step ascending staircase current beginning at zero and ending at said constant current during a seventh output state;
8. energizing said first winding with said constant current and said fourth winding with a multi-step descending staircase current beginning at said constant current and ending at zero during a eighth output state; and
9. repetitively executing steps 1-8 to the extent that the total number of steps in all ascending and all descending staircase currents does not exceed N where N is a selectable whole number.

18. A method for controlling the rest position of a four pole stepping motor with four windings comprising the steps of:

1. energizing the first winding with a constant current not greater in magnitude than a saturating current and energizing the fourth winding with a multi-step ascending staircase current starting at zero and ending at said constant current during a first output state;
2. energizing the fourth winding with said constant current and energizing the first winding with a multi-step descending staircase current starting at said constant current and ending at zero during a second output state;
3. energizing the fourth winding at said constant current and said third winding with a multi-step ascending staircase current beginning at zero and ending at said constant current during a third output state;
4. energizing said third winding with said constant current and said fourth winding with a multi-step descending step staircase current beginning at said constant current and ending at zero during a fourth output state;
5. energizing said third winding with said constant current and said second winding with a multi-step ascending step staircase current beginning at zero and ending at said constant current during a fifth output state;
6. energizing said second winding with said constant current and energizing said third winding with a multi-step descending staircase current beginning at said constant current and ending at zero during a sixth output state;
7. energizing the second winding with said constant current and said first winding with a multi-step ascending staircase current beginning at zero and ending at said constant current during a seventh output state;
8. energizing the first winding with said constant current and the second winding with a multi-step descending staircase signal beginning at said constant current and ending at zero during an eight output state; and
9. repetitively executing steps 1-8 to the extent that the total number of steps in all ascending and all descending staircase currents does not exceed a selectable whole number N.

* * * * *